United States Patent Office 3,192,466
Patented June 29, 1965

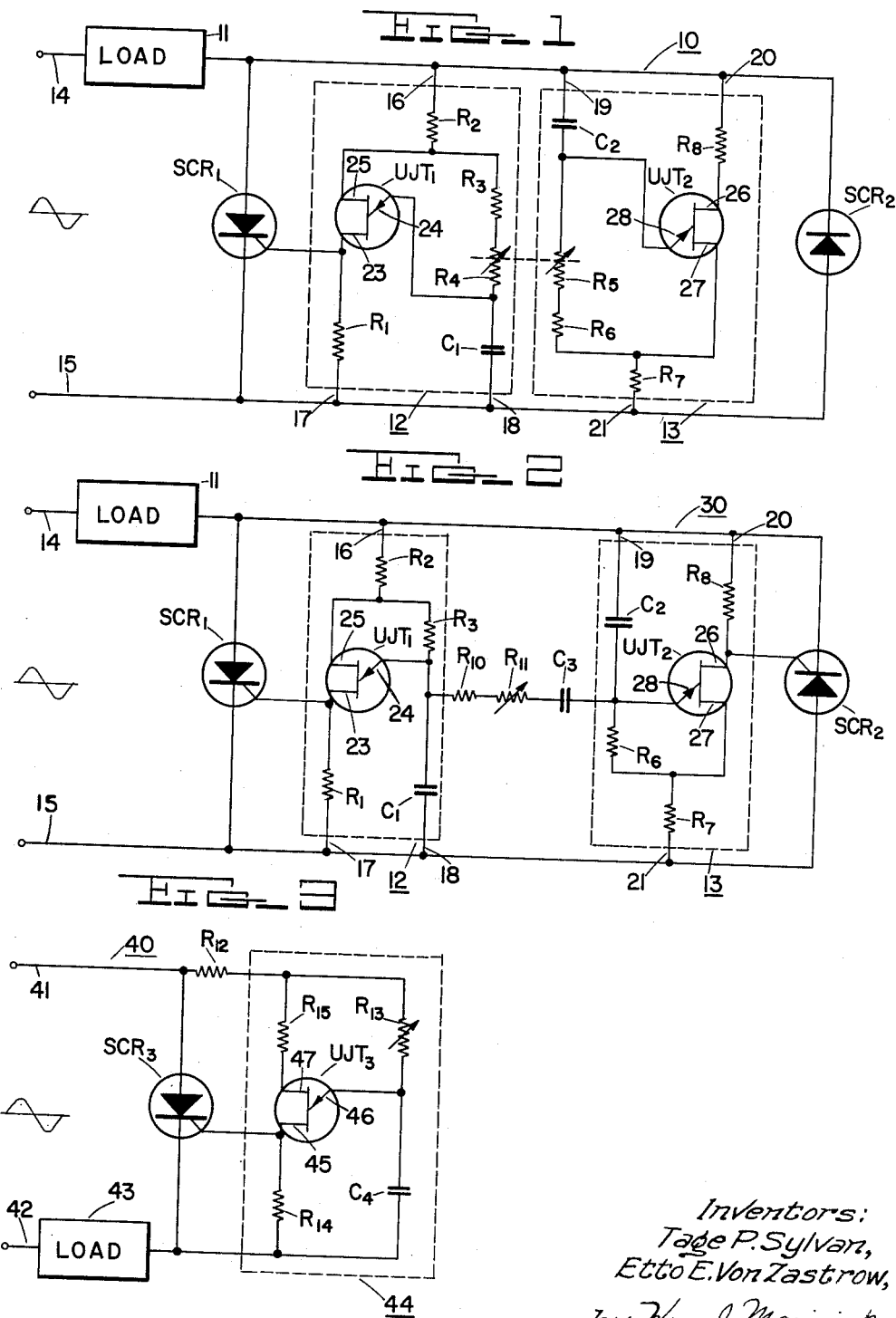

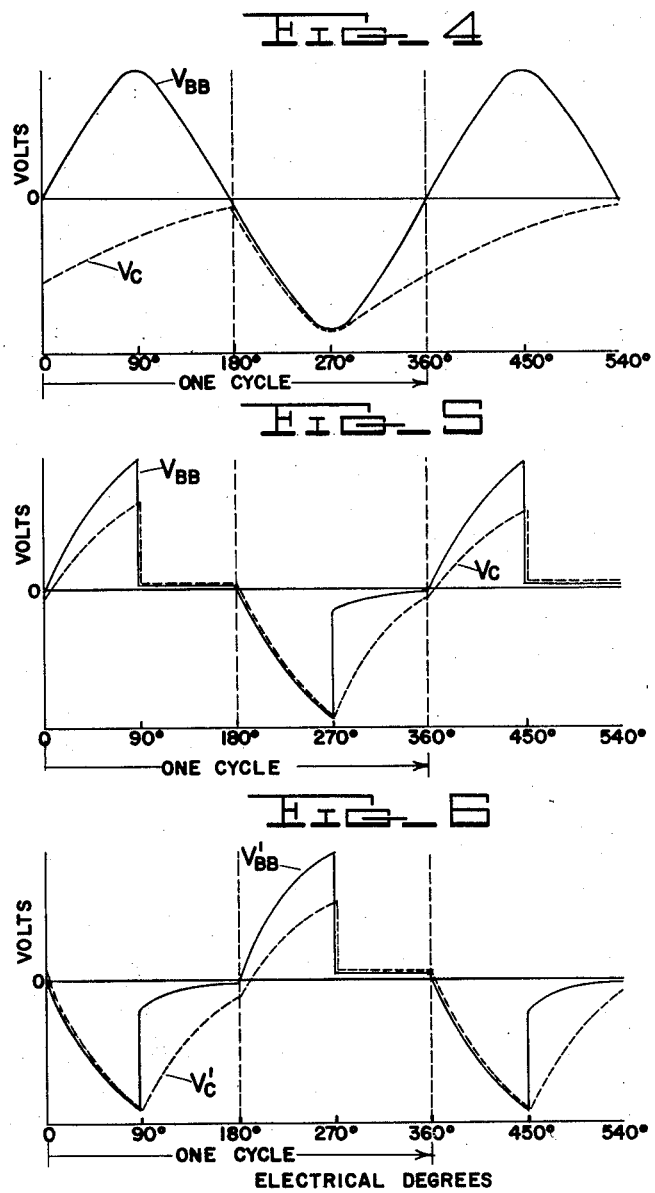

3,192,466
SILICON CONTROLLED RECTIFIER CIRCUIT EMPLOYING AN R-C PHASE CONTROLLED UNIJUNCTION TRANSISTOR FIRING MEANS CONNECTED DIRECTLY ACROSS AN ALTERNATING SUPPLY
Tage P. Sylvan, Liverpool, and Etto E. Von Zastrow, Skaneateles, N.Y., assignors to General Electric Company, a corporation of New York
Filed Oct. 23, 1961, Ser. No. 146,732
10 Claims. (Cl. 323—22)

This invention relates to control circuits utilizing gate-driven controlled rectifiers and more particularly to control circuits employing at least one double base diode in an improved firing circuit arrangement to fire the controlled rectifier at a selected point in each half cycle.

In conventional phase controlled alternating current switches using gate-driven controlled rectifiers in conjunction with double base diodes or unijunction transistors, the firing circuit draws on the voltage developed across the controlled rectifiers during their blocking state. This voltage is converted to a clipped and rectified voltage and is used for interbase supply and synchronization. The clipped and rectified voltage is used to charge a capacitor through a resistor connected in series circuit with the capacitor. The capacitor is connected in circuit with the emitter of the double base diode. Thus, the charging rate of the capacitor determines the point at which the double base diode is forward biased and discharges the capacitor. The discharge current from the capacitor produces a positive pulse which may be used to trigger one or more gate driven controlled rectifiers. Such conventional double base diode or unijunction transistor firing circuits are more fully described at pages 50–56 of the General Electric controlled rectifier manual, 1960 edition.

Although prior art phase control circuits employing double base diodes have been generally satisfactory, these circuits require that a regulated D.C. supply be provided for the firing circuit. In the prior art circuits, rectifiers have been employed to provide the rectified D.C. from an alternating current supply and also zener diodes have been used for regulation of the D.C. supply. These components add to the cost and complexity of the control circuit. Thus, there is a need for a phase control circuit suitable for triggering controlled rectifiers at infinitely variable and predetermined times wherein the components required can be kept at a minimum.

Accordingly, it is a general object of the present invention to provide an improved control circuit for triggering at least one gate-driven controlled rectifier at a predetermined time in each cycle of an alternating current supply.

A more specific object of the invention is to provide an improved control circuit for triggering controlled rectifiers wherein the need for a D.C. supply is eliminated.

These and other objects and advantages of the invention are achieved in a control circuit wherein at least one controlled rectifier is fired at a selected phase angle by a firing circuit having a double base diode connected in circuit with an alternating current supply. A capacitor is connected in circuit with the emitter electrode and the base-one electrode of the double base diode. A resistive means is connected in circuit with the capacitor for controlling the phase displacement and amplitude of the voltage across the capacitor and thereby fixing in each half cycle, or alternate half cycle, the point or phase angle at which the double base diode and the controlled rectifier can be fired.

In another aspect of the invention, we have provided a phase control circuit utilizing a pair of controlled rectifiers connected in a back-to-back arrangement and a pair of unijunction transistor firing circuits connected inversely in circuit across the alternating current supply so that one of the firing circuits exercises control over one of the controlled rectifiers during the positive half of each cycle and the other firing circuit exercises control over the other controlled rectifier during the negative half cycle.

Each of the firing circuits include a capacitor connected in circuit with the emitter electrode of the unijunction transistor. The capacitors of the two firing circuits are connected in circuit with a potentiometer or variable resistor. When the potentiometer is adjusted, the phase displacement and amplitude of the substantially sinusoidal voltage across the capacitors is varied so that the unijunction transistors can be fired at selected points in each cycle as determined by the setting of the potentiometer. If desired, a separate potentiometer or variable resistor may be connected in circuit with each of the capacitors in lieu of the one potentiometer coupling both of the unijunction transistor firing circuits. Thus, in accordance with the invention, complete phase control of one or more gate-driven controlled rectifiers may be achieved without need for a source of direct current.

The subject matter which we regard as our invention is set forth in the appended claims. The invention itself, however, together with further objects and advantages thereof may be understood by referring to the following description taken in connection with the accompanying drawings in which:

FIG. 1 is a schematic circuit diagram of a control circuit illustrating one embodiment of the invention;

FIG. 2 is a schematic circuit diagram of a control circuit illustrating another embodiment of the invention;

FIG. 3 is a schematic circuit diagram of a control circuit in a half wave configuration embodying the invention;

FIG. 4 illustrates the voltage waveforms of the interbase voltage $V_{BB}$ of unijunction transistor $UJT_1$ of the control circuit shown in FIG. 1 and the waveform of the voltage across the capacitor $V_C$ corresponding to an RC time constant having a relatively large value;

FIG. 5 illustrates the voltage waveforms of the interbase voltage $V_{BB}$ of unijunction transistor $UJT_1$, and the capacitor voltage $V_C$ across capacitor $C_1$ of the control circuit shown in FIG. 1 corresponding to an RC time constant whereby the controlled rectifiers are fired alternately, one being fired at the midpoint of each half cycle;

FIG. 6 illustrates the voltage waveforms of the interbase voltage $V'_{BB}$ of unijunction transistor $UJT_2$ and the capacitor voltage $V'_C$ across capacitor $C_2$ of the control circuit shown in FIG. 1 corresponding to an RC time constant whereby the controlled rectifiers are fired, alternately, one being fired at the midpoint of each half cycle;

Figure 7:
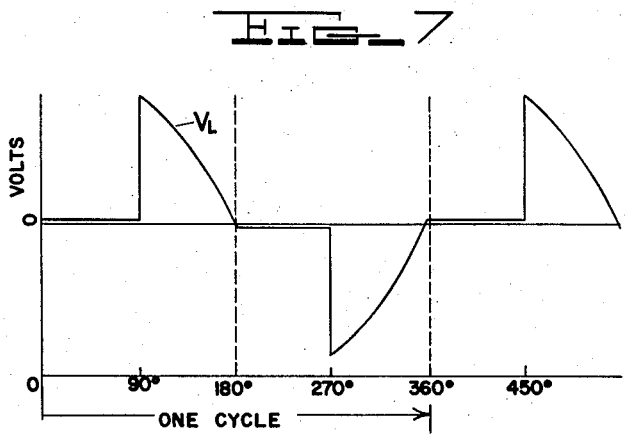
Figure 8:
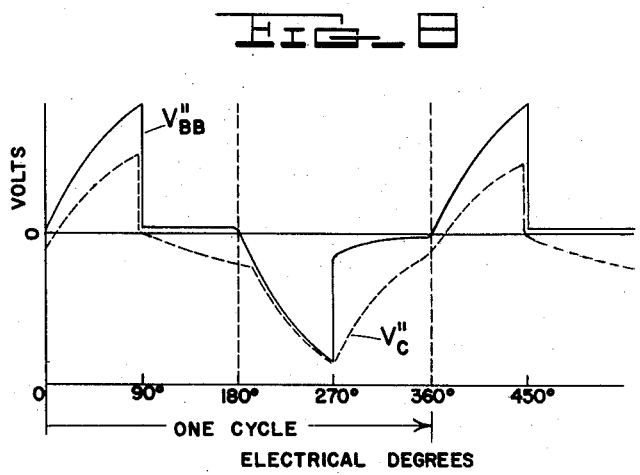

FIG. 7 illustrates the voltage waveform of the load voltage $V_L$ (for a primarily resistive load) of the control circuit shown in FIG. 1; and FIG. 8 illustrates the waveforms of the interbase voltage $V''_{BB}$ of unijunction transistor $UJT_1$ and the voltage $V''_C$ across capacitor $C_1$ of the control circuit shown in FIG. 2, corresponding to an RC time constant whereby a controlled rectifier is fired at approximately the midpoint of each alternate half cycle of the power supply.

Having reference now to the schematic circuit diagram of the control circuit illustrated in FIG. 1 and generally identified by reference numeral 10, it will be seen that the control circuit 10 includes a pair of controlled rectifiers $SCR_1$, $SCR_2$ connected in a back-to-back arrangement to exercise full wave phase control when the power is supplied to a load 11. It will be seen that control circuits 12, 13 are energized from the load side across input terminal leads 14, 15 and are connected in circuit therewith.

The firing angle of the controlled rectifiers $SCR_1$, $SCR_2$ is controlled by firing circuits 12 and 13 shown enclosed in the dashed rectangles. Input terminal leads 14, 15 are provided for connection to a suitable alternating current supply, such as a 60 cycle, 117 volt supply. Thus, power will be supplied to the load 11 only when one of the pair of controlled rectifiers $SCR_1$ or $SCR_2$ is triggered into a conducting state. By alternately triggering one and then the other of the pair of controlled rectifiers $SCR_1$, $SCR_2$ at a predetermined or selected point in each half cycle, the amount of power supplied to load 11 may be controlled.

The controlled rectifiers $SCR_1$, $SCR_2$ and $SCR_3$, used in the illustrative embodiment of the invention shown in FIGS. 1, 2 and 3, are PNPN semiconductors having three terminals, an anode represented by the arrow symbol, a cathode represented by the line drawn through the apex of the arrow symbol and a gate represented by the diagonal line extending from the cathode. Preferably, silicon controlled rectifiers may be employed in the control circuits since the operating characteristics of a silicon controlled rectifier are such that it conducts in a forward direction with a forward characteristic very similar to that of an ordinary rectifier when a gate signal is applied. It will continue conduction even after the gate signal is removed if a minimum holding current is supplied to the controlled rectifier.

When a positive voltage is applied to the outside P layer and a negative voltage is applied to the outside N layer, the two outside junctions of the silicon controlled rectifier are biased in a forward direction while the inner junctions are reversely biased. Under these conditions, current does not flow through the controlled rectifier except for a small leakage current. When the voltage is increased to the breakover voltage, the current gain of the silicon controlled rectifier increases to unity at which time the current through the controlled rectifier increases suddenly and becomes the function of the applied voltage and the load impedance. Since the current supplied to the gate lowers the breakover voltage, a small current pulse supplied to the gate electrode can be used for controlling the firing of the controlled rectifier.

The current pulses required to fire controlled rectifiers $SCR_1$ and $SCR_2$ are supplied by the firing circuits 12, 13. It will be seen that electrical leads 16, 17, 18 connect firing circuit 12 across the input terminal leads 14 and 15. Similarly, electrical leads 19, 20, 21 connect firing circuit 13 across input terminal leads 14, 15. It will be seen, therefore, that both firing circuits 12 and 13 are inversely connected across the input terminal leads 14, 15 and are energized on the load side of input terminal lead 14.

Continuing now with a more detailed description of the firing circuits 12, 13 as shown in FIG. 1, it will be seen that unijunction transistor $UJT_1$ of firing circuit 12 has a base-one electrode 23 connected in circuit with the gate of controlled rectifier $SCR_1$ and a resistor $R_1$. A capacitor $C_1$ is connected in circuit with an emitter electrode 24. Thus, when the capacitor voltage reaches the peak point voltage of unijunction transistor $UJT_1$, it is fired and the voltage of capacitor $C_1$ is applied across the resistor $R_1$ to provide a pulse having sufficient amplitude to fire control rectifier $SCR_1$. Base-two electrode 25 of unijunction transistor $UJT_1$ is connected in circuit with a common junction to which the current limiting resistor $R_2$, a resistor $R_3$ and variable resistor $R_4$ are connected. The variable resistor $R_4$ or potentiometer is ganged with the variable resistor or potentiometer $R_5$ of firing circuit 13. Resistors $R_3$ and $R_4$ may be combined into a single resistor, if desired. These resistors serves as a resistive means to adjust the RC time constant of firing circuit 12 and thereby control the phase displacement and amplitude of the voltage across capacitor $C_1$.

Firing circuit 13 is similar to firing circuit 12 except that it is connected in inverse relation across input terminal leads 14, 15 so that unijunction transistor $UJT_2$ can be triggered during the alternation of the alternating current supply which is of opposite polarity to the alternation which causes unijunction transistor $UJT_1$ to be fired. Similarly, as in firing circuit 12, base-one electrode 26 of unijunction transistor $UJT_2$ is connected in circuit with the gate of controlled rectifier $SCR_2$. The base-two electrode 27 is connected in circuit with the common junction to which variable resistor $R_5$, resistor $R_6$ and resistor $R_7$ are connected in circuit. It will be noted that capacitor $C_2$ is connected in circuit with the emitter electrode 28.

The unijunction transistors $UJT_1$, $UJT_2$ and $UJT_3$ employed in the illustrative embodiments of the invention were double base diodes having an emitter electrode, a base-one electrode and a base-two electrode. The base-one and base-two electrodes are connected across a layer of N-type semiconductor material. The emitter electrode is connected to a P-type semiconductor material which forms a PN junction with the N-layer. If the voltage applied at the emitter electrode is less than the peak point voltage of the unijunction transistor, the emitter is reverse biased and only a small amount of reverse-bias leakage current will flow through the PN junction. When the applied emitter voltage equals or exceeds the peak point voltage, the PN junction becomes forward biased and current will begin to flow between the emitter and the base-one electrode. At this instant, the unijunction transistor assumes a negative resistance characteristic wherein the resistance between the emitter electrode and the base-one electrode is inversely proportional to the current flowing thereto. Further, at this instant the unijunction transistor is fired. It will be appreciated that although unijunction transistors have been employed in the illustrative embodiments of the invention, other semiconductor devices having similar characteristics may be employed.

In FIG. 2, we have illustrated a control circuit 30 which is a modified version of the full wave phase control circuit 10 shown in FIG. 1 wherein the need for ganged potentiometers is eliminated by using a cross coupling network between the firing circuits 12, 13. The cross coupling network is comprised of a resistor $R_{10}$, a variable resistor or potentiometer $R_{11}$ and a capacitor $C_3$. In the modified control circuit 30 shown in FIG. 3, the corresponding parts of the two control circuits 10, 30 are identified by the same reference numerals. The description of these corresponding parts hereinbefore set forth in connection with the control circuit 10 of FIG. 1 is equally applicable to control circuit 30. As in control circuit 10 shown in FIG. 1, the two half wave circuits which are comprised of controlled rectifier $SCR_1$ and its associated firing circuit 12 and controlled rectifier $SCR_2$ and its associated firing circuit 13 are connected in a back-to-back arrangement.

Referring now to FIG. 3, we have illustrated therein a control circuit 40 wherein a single controlled rectifier $SCR_3$ is turned on in each alternate half cycle to control the power supplied to a load 43. The controlled rectifier $SCR_3$ is commutated by the reversal of the supply voltage that occurs at the end of the cycle. A pair of input terminal leads 41, 42 are provided for connection to a suitable alternating current source such as a 117 volt, 60 cycle supply. The firing circuit 44 shown in the dashed rectangle draws upon the alternating current supply for the interbase supply and synchronization of unijunction transistor $UJT_3$. As in the other firing circuits, a resistor $R_{12}$ is provided to limit the current supplied to the firing circuit 44. The variable resistor or potentiometer $R_{13}$ is used to adjust the RC time constant of the firing circuit 44 and to thereby vary the phase displacement and amplitude of the voltage across the capacitor $C_4$. Resistor $R_{14}$ which is connected in circuit with the base-one electrode 45 of unijunction transistor $UJT_3$ is provided so that a predetermined voltage drop occurs thereacross when the unijunction transistor $UJT_3$ is triggered. Emitter electrode 46 of the unijunction transistor $UJT_3$ is connected to a common junction to which one end of the variable resistor $R_{13}$ and the capacitor $C_4$ are joined. A temperature compensating resistor $R_{15}$ may, if desired, be connected to the base-two electrode 47 of the unijunction transistor $UJT_3$.

Having reference now to the schematic circuit diagrams as shown in FIGS. 1 and 2, the operation of the control circuits 10, 30 will now be more fully described. The operation is initiated by energizing the input terminal leads 14, 15 from a suitable alternating current supply. In accordance with the invention, both of the firing circuits 12, 13 are energized directly from the alternating current source.

Referring now more specifically to the circuit shown in FIG. 1, let us assume that the ganged potentiometers $R_4$ and $R_5$ are in the "off" position or in a maximum resistance setting. In FIG. 4, we have illustrated the waveforms for the interbase voltage $V_{BB}$ of the unijunction transistor $UJT_1$ and the voltage $V_C$ across the capacitor $C_1$. During this condition, it will be apparent that both of the controlled rectifiers $SCR_1$ and $SCR_2$ are in a blocking state and no power is being supplied to the load. It will be seen that the waveform of voltage $V_C$, as shown in FIG. 4, is substantially a phase displaced sinusoidal wave except during the portion of the cycle when it is clamped to the interbase voltage where it is rendered more negative by action of the emitter junction of unijunction transistor $UJT_1$. Since for this setting of the ganged potentiometers $R_4$, $R_5$ the voltage $V_C$ never rises to the peak point voltage of the unijunction transistor $UJT_1$, the unijunction transistor $UJT_1$ is not fired. In a similar manner, the voltage across capacitor $C_2$ is so displaced with respect to the interbase voltage that it never reaches the peak point voltage of unijunction transistor $UJT_2$.

It was found that, as time constant of the RC network of firing circuits 12, 13 is reduced by decreasing the amount of resistance in series circuit with the capacitors $C_1$, $C_2$, the phase displacement of the voltages across the capacitor $C_1$, $C_2$ is reduced and its amplitude is increased. Further, it was determined that full control can be achieved over the power delivered to an A.C. load by providing suitable parameters in the RC network which will allow the capacitor voltage to be selectively adjusted so that emitter voltage can be made to reach the peak point voltage of the unijunction transistors $UJT_1$, $UJT_2$ at any predetermined point in a half cycle.

In FIG. 5, we have illustrated the waveforms of the interbase voltage $V_{BB}$ and the voltage across capacitor $C_1$ wherein the capacitor voltage is displaced to a point where the emitter voltage is caused to reach the peak point voltage of unijunction transistor $UJT_1$ at the approximate midpoint of each half cycle. The corresponding interbase voltage $V'_{BB}$ of unijunction transistor $UJT_2$ and voltage $V'_C$ across $C_2$ of the firing circuit 13 is shown in FIG. 6. Further, in FIG. 7 we have illustrated the corresponding waveform of the voltage $V_L$ across the load 11, which is substantially resistive. Thus, it will be seen that the load 11 is being supplied with power only for one half of each half cycle of the alternating current supply.

Turning again to FIG. 5, it will be seen that when the capacitor voltage $V_C$ becomes equal to the peak point voltage, which is the product of the stand-off ratio and the interbase voltage, unijunction transistor $UJT_1$ is fired. Silicon controlled rectifier $SCR_1$, which has its gate connected in circuit with the base-one electrode 23, is also fired. As will be seen from the waveform of the voltage $V_{BB}$, when controlled rectifier $SCR_1$ is fired the interbase voltage $V_{BB}$ and the capacitor voltage $V_C$ drop to the value of the forward voltage drop of the controlled rectifier $SCR_1$. It will be noted from the waveform of the interbase voltage $V'_{BB}$ of unijunction transistor $UJT_2$ that when unijunction transistor $UJT_1$ is fired, the interbase voltage $V'_{BB}$ of unijunction transistor $UJT_2$ is decreased. Thus, during the conduction period of controlled rectifier $SCR_1$, unijunction transistor $UJT_2$ sees negative voltage. As a result, smaller time integral of the negative voltage causes a smaller negative average voltage across the capacitor $C_2$.

Since the controlled rectifiers $SCR_1$, $SCR_2$ are connected in a back-to-back arrangement, one of the controlled rectifiers conducts during the positive half of the cycle and the other conducts during the negative half of the cycle as shown. It will be understood, of course, that as the firing angle of the controlled rectifiers $SCR_1$, $SCR_2$ is delayed, the amount of power supplied to the load 11 is decreased. The conducting controlled rectifier is turned off at the end of each half cycle due to the voltage reversal that takes place at the end of the half cycle.

From the foregoing description of the operation of the control circuits of the invention, it will be seen that the action of the circuit is functionally analogous to a combination of an A.C. phase shift superposed on a variable direct current source. Such a function is normally achieved in circuits employing transformers and separate power supplies. The variable direct current in the circuit arrangement of the invention is a function of the firing angle of the preceding half cycle in the other half of the circuit. This feature provides the advantage in that it is possible to operate the ganged potentiometers $R_4$, $R_5$ within commercial tolerances and also affords a compensating action for other unbalances in the circuit.

Assuming that controlled rectifier $SCR_1$ is fired in the positive half cycle of the alternating current supply, the instantaneous current follows a path which may be traced from input terminal lead 14 through load 11, controlled rectifier $SCR_1$, and to the output terminal lead 15. In the next half cycle when controlled rectifier $SCR_2$ is fired, the instantaneous current traverses a reverse path. It may be traced from input terminal lead 15 through controlled rectifier $SCR_2$, the load 11 and to input terminal lead 14.

The operation of the control circuit 30 shown in FIG. 2 is substantially similar to the control circuit 10 as shown in FIG. 1. It will be apparent from the waveforms of the interbase voltage $V''_{BB}$ and the capacitor voltage $V''_C$ shown in FIG. 8 that the cross coupled firing circuits 12, 13 exercise full phase control over each half cycle in the same manner as the circuit shown in FIG. 1. However, an additional voltage appears across the capacitor $C_1$ after the unijunction transistor $UJT_1$ is fired at the 90 degree point. This additional voltage may be considered to result from the additional current being supplied to capacitor $C_1$ from control circuit 13 while controlled rectifier $SCR_1$ is conducting. By adjusting the potentiometer $R_{11}$, the phase displacement and amplitude of the voltage across the capacitors $C_1$ and $C_2$ can be readily varied so that a full 180 degree phase control is exercised over each half cycle of the alternating current supplied to the load 11. It will be appreciated that the cross coupling arrangement provides the advantage that the need for ganged potentiometers is eliminated. Further, the cross coupling arrangement possesses all of the advantages of the invention whereby a complete control of the power supplied is achieved with a minimum number of circuit components.

The capacitor $C_3$ may be considered as one element in the two shunt paths in series with each of the capacitors $C_1$, $C_2$. The unijunction transistors $UJT_1$, $UJT_2$ will fire when the voltage across capacitor $C_1$, $C_2$, respectively, reaches the peak point voltage. The manner in which this voltage appears across capacitors $C_1$, $C_2$ is determined by means of the time integral of the current supplied to it by two shunt paths. For capacitor $C_1$ of control circuit 12, the first shunt path includes resistors $R_2$ and $R_3$, and the second shunt path includes capacitor $C_2$, capacitor $C_3$, resistor $R_{11}$ and resistor $R_{10}$. Thus, the parameters of the two shunt paths determine the point in time when the voltage across capacitor $C_1$ is sufficient to fire its associated unijunction transistor $UJT_1$.

Similarly, for capacitor $C_2$, the first shunt path includes the resistors, $R_6$ and $R_7$, and the second shunt path includes capacitor $C_1$, resistor $R_{10}$, resistor $R_{11}$ and capacitor $C_3$. The parameters of these two shunt paths determine the point in time when the voltage across capacitor $C_2$ is sufficient to fire its associated unijunction transistor $UJT_1$. It will be seen that the resistors $R_{10}$, $R_{11}$ and capacitor $C_3$ are in the shunt path which is common to both capacitors $C_1$ and $C_2$ of control circuits 12, 13. This arrangement provides the advantage that the need for ganged potentiometers is eliminated and that a single potentiometer or variable resistor $R_{11}$ may be used.

The operation of the half wave single phase circuit 40 shown in FIG. 3 is similar in action to the full wave control circuit shown in FIGS. 1 and 2. However, in the half wave version, phase control is exercised only in alternate half cycles of the alternating current supply. When the potentiometer 13 is in the "off" position, as in the other control circuits, the voltage across the capacitor $C_4$ is a phase displaced substantially sinusoidal wave. The wave form of the voltage across capacitor $C_4$ is substantially similar to the voltage waveform $V_C$ as shown in FIG. 4. Since for this condition of the control circuit 40, the emitter voltage of unijunction transistor $UJT_3$ never reaches the peak point voltage, unijunction transistor $UJT_3$ will not be fired.

As potentiometer $R_{13}$ is adjusted, the time constant of the RC network, which includes the potentiometer $R_{13}$ and the capacitor $C_4$, is reduced. Accordingly, the phase displacement of the capacitor voltage is reduced and its amplitude is increased. Hence, the voltage at the emitter electrode 46 is increased and rises to the peak point voltage of the unijunction transistor $UJT_3$ at some predetermined point in the half cycle causing the unijunction transistor $UJT_3$ to be fired. Silicon controlled rectifier $SCR_3$ is triggered into a conducting state. Thus, the instantaneous current follows a path from input terminal lead 41, controlled rectifier $SCR_3$, the lead 43 and to input terminal lead 42.

The control circuit 40 shown in FIG. 3 was operated from a 117 volt 60 cycle power supply. This circuit employed the following components which are given by way of illustration:

| | |
|---|---|
| Controlled rectifier $SCR_3$ | General Electric C10B silicon controlled rectifier. |
| Unijunction transistor $UJT_3$ | General Electric 2N492. |
| Resistor $R_{12}$ | 30,000 ohms. |
| Resistor $R_{13}$ | 0–50,000 ohms. |
| Resistor $R_{14}$ | 47 ohms. |
| Resistor $R_{15}$ | 390 ohms. |
| Capacitor $C_4$ | 0.1 microfarads. |

It was found that the swing of the capacitor direct current bias in the control circuit shown in FIG. 3 was much less than for the full wave circuit shown in FIG. 2. It was approximately 9 volts as compared with 18.4 volts in the full wave control circuit.

From the foregoing description of the illustrative embodiments of the invention, it will be seen that an improved control circuit is provided wherein one or more controlled rectifiers can be readily triggered at variable predetermined times by adjusting the parameters of the unijunction firing circuit so the firing point is controlled by varying the amplitude and phase displacement of the capacitor voltage. Such an arrangement makes it possible to connect the firing circuits directly across the alternating current supply. Thus, full wave or half wave control of an A.C. supply can be achieved without the need for zener diodes and rectifying circuits as was heretofore required in firing circuits employing double base diodes.

While the present invention has been described by reference to preferred embodiments thereof, it is to be understood that many modifications may be made without actually departing from the invention. It is, therefore, intended by the appended claims to cover all such modifications that fall within the true spirit and scope of the invention.

What we claim as new and desire to secure by Letters Patent of the United States is:

1. A control circuit for firing at least one gate-driven controlled rectifier at a selected phase angle comprising an alternating source, at least one controlled rectifier having an anode, cathode and gate electrode, said anode and cathode electrodes connected in circuit across said alternating source, a double base diode means having a base-one, a base-two and an emitter electrode, said base-one and base-two electrodes being connected in circuit across said alternating source, said emitter electrode being forward biased when the emitter voltage reaches a predetermined fractional part of the voltage across said base-one and base-two electrodes, said base-one electrode being connected in circuit with the gate electrode of the controlled rectifier, a capacitor connected in circuit with said emitter electrode and said base-one electrode, and a potentiometer connected in series circuit relation with said capacitor and in circuit with the alternating source, said potentiometer causing the phase displacement and amplitude of the voltage across said capacitor to be varied so that the emitter voltage reaches said fractional part of the voltage across the base-one and base-two electrodes at a selected phase angle thereby causing said double base diode means and said controlled rectifier to fire.

2. A control circuit for firing at least one gate-driven controlled rectifier comprising an alternating current source, a pair of input leads connected to said alternating current source, a controlled rectifier having an anode, cathode and a gate electrode, said anode and cathode electrodes connected in circuit across the input leads, double base diode means having a base-one, a base-two, and an emitter electrode, said base-one and base-two electrodes being connected in circuit across said input leads, said emitter electrode being forward biased when the emitter voltage reaches a predetermined fractional part of the voltage across said base-one and base-two electrodes, said base-one electrode being connected in circuit with the gate of the controlled rectifier, a capacitor connected in circuit with said emitter electrode and said base-one electrode, and a resistive means connected in series circuit relation with said capacitor and one of said input leads, said resistive means determining the phase displacement and amplitude of the voltage across said capacitor thereby fixing the phase angle at which said double base diode means and said controlled rectifier are fired.

3. A control circuit comprising an alternating current supply, at least one controlled rectifier having an anode, a cathode and a gate, said anode and cathode connected in circuit across the alternating current supply, a double base diode means having a base-one, a base-two and an emitter electrode, said base-one and base-two electrodes being connected in circuit across said alternating current supply, said emitter electrode being forward biased when the emitter voltage reaches a predetermined fractional part of the voltage across said base-one and base-two electrodes, a circuit means connecting said base-one electrode in circuit with the gate of said controlled rectifier so that when said emitter is forward biased a pulse of current is supplied to the gate of the controlled rectifier, a capacitor connected in circuit with said emitter electrode and said base-one electrode, and a potentiometer connected in series circuit relation with said capacitor and in circuit with said alternating current supply, said potentiometer causing the phase displacement and amplitude of said voltage across said capacitor to be varied so that the emitter voltage reaches said fractional part of the voltage across the base-one and base-two electrodes at a selected phase angle to fire said double base diode means and said controlled rectifier.

4. A control circuit comprising an alternating current supply, a pair of input terminal leads connected with said alternating current supply, a controlled rectifier having an anode, cathode and gate electrode, said anode and cathode electrodes being connected in circuit across said input terminal leads, a unijunction transistor having a base-one, a base-two and an emitter electrode, said base-one and base-two electrodes being connected in circuit across said input terminal leads, said unijunction transistor being triggered when the emitter voltage reaches a predetermined fractional part of the voltage of the interbase voltage, a capacitor connected in circuit with said emitter electrode and said base-one electrode, circuit means connecting said base-one electrode in circuit with the gate of said controlled rectifier so that when said unijunction transistor is triggered, a firing pulse is supplied to the gate of said controlled rectifier, and a potentiometer connected in circuit with said capacitor and one of said input leads whereby the phase displacement and amplitude of voltage across the capacitor can be varied to cause the emitter voltage of said unijunction transistor to reach said predetermined fractional part of the interbase voltage at a selected point in the half cycle and thereby fire the controlled rectifier.

5. A control circuit for regulating in each half cycle of an alternating current supply the interval of current conduction comprising an alternating current supply, a pair of input terminal leads connected in circuit with said alternating current supply, a part of gate-driven controlled rectifiers connected in inverse parallel relation across said input terminal leads, a first firing circuit means and a second firing circuit means connected inversely in circuit with said input terminal leads so that the first firing circuit means exercises control over one of said controlled rectifiers during the positive half of the alternating current supply and the second firing circuit means exercises control over the other controlled rectifier in the negative half of the cycle, each of said firing circuit means including a unijunction transistor having a base-one, a base-two and an emitter electrode, said base-one and said base-two electrodes connected across the alternating current supply, a capacitor connected in circuit with said emitter electrode and said base-one electrode, a potentiometer connected in circuit with said capacitor and one of said input leads and circuit means connecting the base-one electrode of said unijunction transistors in circuit with the gates of said controlled rectifiers, said potentiometers when adjusted causing the phase displacement and amplitude of the voltage across said capacitors to vary so that the firing point of said unijunction transistor and said controlled rectifiers can be controlled in each half cycle.

6. The control circuit set forth in claim 5 wherein the potentiometers are ganged to provide a unitary control for said circuit.

7. A circuit for controlling the power supplied to a load by regulating the interval of current conduction in each half cycle of an alternating current supply comprising an alternating current supply; a pair of input leads connected in circuit with the alternating current supply; a pair of gate-driven controlled rectifiers connected in inverse parallel relation across said input terminal leads; a first and a second firing circuit means connected in inverse relation across said input terminal leads so that said first firing circuit means exercises control over one of said controlled rectifiers in one-half of each cycle and said second firing circuit means exercises control of the other controlled rectifier in the other half of each cycle of the alternating current supply, each of said firing control circuit means including a double base diode means having a base-one, a base-two and an emitter electrode, with the base-one and base-two electrodes connected across the alternating current supply, a capacitor connected in circuit with said emitter electrode and said base-one electrode, circuit means connecting the base-one electrodes in circuit with the gates of said controlled rectifiers, and resistive means connected in circuit with the capacitor of each of said firing circuit means, said resistive means when varied causing the phase displacement and amplitude of the voltage across said capacitors to vary so that one of said double base diode means is alternately fired at a predetermined point in each half cycle thereby alternately triggering said controlled rectifiers at a selected point in each half cycle.

8. The circuit for controlling the power supplied to a load set forth in claim 7 wherein said resistive means of said firing control circuit means are connected in circuit with a potentiometer and a capacitor connected in series circuit relation.

9. A control circuit comprising an alternating current supply, a first and a second input terminal lead connected in circuit with alternating current supply, a pair of gate-driven controlled rectifiers connected in inverse parallel relation in circuit with said first and second input terminal leads, a first and a second unijunction transistor, each of said unijunction transistors having a base-one, a base-two and an emitter electrode, said base-two electrode of said first unijunction transistor being connected in circuit with said first input lead, said base-two electrode of said second unijunction transistor being connected in circuit with said second input terminal lead, said base-one electrode of said first unijunction transistor being connected in circuit with said second input terminal lead and said base-one electrode of said second unijunction transistor being connected in circuit with said first input terminal lead, a first circuit means connecting the gate of one of said controlled rectifiers in circuit with the base-one electrode of said first unijunction transistor to cause said one of said controlled rectifiers to be fired when said first unijunction transistor is fired, a second circuit means connecting the base-one electrode of said second unijunction transistor in circuit with the gate of the other of said controlled rectifiers to fire said other of said controlled rectifiers when the second unijunction transistor is fired, a first capacitor connected in circuit with the emitter electrode and the base-one electrode of said first unijunction transistor, a second capacitor connected in circuit with the emitter and base-one electrode of the second unijunction transistor, a first resistor connected in circuit with said first capacitor and first input lead, a second resistor connected in circuit with said second capacitor and second input terminal lead, a potentiometer connected in circuit with said first capacitor and said second capacitor, said potentiometer when adjusted causing the phase displacement and amplitude of the voltage across said first and said second capacitors to be varied so that the first unijunction transistor is fired at a predetermined point in one half of the cycle of the alternating current supply and the second unijunction transistor is fired at a predetermined point in the other half of the cycle thereby alternately firing said controlled rectifiers.

10. The control circuit set forth in claim 9 wherein a capacitor is connected in series circuit with said potentiometer.

References Cited by the Examiner

UNITED STATES PATENTS 2,806,197    9/57    Rockafellow _____ 323—24 X
3,129,357    4/64    Ullmann et al. _____ 307—88.5

OTHER REFERENCES

G.E.-Controlled Rectifier Manual, March 21, 1960, Chapters 4 and 7, pages 55, 57, 94, 96.

LLOYD McCOLLUM, *Primary Examiner.*

UNITED STATES PATENT OFFICE
CERTIFICATE OF CORRECTION

Patent No. 3,192,466                           June 29, 1965

Tage P. Sylvan et al.

It is hereby certified that error appears in the above numbered patent requiring correction and that the said Letters Patent should read as corrected below.

In the drawings, FIG. 1, a lead line should be added between the base-one electrode 26 of unijunction transistor $JT_2$ and the gate of controlled rectifier $SCR_2$.

Signed and sealed this 15th day of March 1966.

(SEAL)
Attest:

ERNEST W. SWIDER                      EDWARD J. BRENNER

Attesting Officer                       Commissioner of Patents